(12) United States Patent
Herman et al.

(10) Patent No.: US 10,193,627 B1
(45) Date of Patent: Jan. 29, 2019

(54) DETECTION OF VISIBLE LIGHT COMMUNICATION SOURCES OVER A HIGH DYNAMIC RANGE

(71) Applicant: FORD GLOBAL TECHNOLOGIES, LLC, Dearborn, MI (US)

(72) Inventors: David M. Herman, Southfield, MI (US); Grant Inskeep, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/993,991

(22) Filed: May 31, 2018

(51) Int. Cl.
| H04B 10/116 | (2013.01) |
| H04N 5/3745 | (2011.01) |
| H04N 5/235 | (2006.01) |
| H04N 5/359 | (2011.01) |
| H04B 10/67 | (2013.01) |
| H04N 5/353 | (2011.01) |

(52) U.S. Cl.
CPC ......... *H04B 10/116* (2013.01); *H04B 10/671* (2013.01); *H04N 5/2353* (2013.01); *H04N 5/3532* (2013.01); *H04N 5/3597* (2013.01); *H04N 5/3745* (2013.01)

(58) Field of Classification Search
CPC .. H04B 10/116; H04B 10/671; H04N 5/3745; H04N 5/2353; H04N 5/3597; H04N 5/3532
See application file for complete search history.

(56) References Cited

U.S. PATENT DOCUMENTS

| 9,450,671 B2 | 9/2016 | Chen et al. |
| 9,791,727 B2 | 10/2017 | Aoyama et al. |
| 2006/0140445 A1 | 6/2006 | Cusack, Jr. |
| 2009/0153710 A1 | 6/2009 | John |

(Continued)

FOREIGN PATENT DOCUMENTS

| CN | 103841732 A | 6/2014 |
| CN | 107370538 A | 11/2017 |
| CN | 105515657 B | 1/2018 |

(Continued)

OTHER PUBLICATIONS

Duy Thong Nguyen, et al., Data Rate Enhancement of Optical Camera Communications by Compensating Inter-Frame Gaps, Optics Communications 394 (2017) 56-61.

(Continued)

*Primary Examiner* — Leslie C Pascal
(74) *Attorney, Agent, or Firm* — Frank A. MacKenzie; MacMillan, Sobanski & Todd, LLC

(57) ABSTRACT

A visible light communication (VLC) receiver captures frames of a scene with a camera to detect flashing light signals from a VLC transmitter such as an array of LEDs. The method assembles an enhanced dynamic range image sequence from the frames. At least one VLC source is detected in the enhanced sequence, wherein the source occupies a respective subwindow within the scene. An imaging exposure such as the exposure time used for capturing images at the subwindow is optimized according to a brightness of the respective VLC source. Then a plurality of subwindow images are captured using the optimized exposure. VLC data visible in the subwindow images is then decoded.

20 Claims, 6 Drawing Sheets

(56) References Cited

U.S. PATENT DOCUMENTS

2017/0219684 A1* 8/2017 Jovicic ............... H04W 64/006

FOREIGN PATENT DOCUMENTS

| CN | 107612617 | A | 1/2018 |
| JP | 2011055397 | A | 3/2013 |
| KR | 101798043 | B1 | 11/2017 |

OTHER PUBLICATIONS

Chi-Wai Chow, et al., Visible Light Communication Using Mobile-Phone Camera with Data Rate Higher than Frame Rate, Optics Express, vol. 23, No. 20, 2015.
Takaya Yamazato, et al, Image-Sensor-Based Visible Light Communication for Automotive Applications, IEEE Communications Magazine, Jul. 2014
Yuki Goto, et al., A New Automotive VLC System Using Optical Communication Image Sensor, IEEE Photonics Journal, vol. 8, No. 3, Jun. 2016.
Trang Nguyen et al, Design and Implementation of a Novel Compatible Encoding Scheme in the Time Domain for Image Sensor Communication, Sensors 2016.
Nilufa Yeasmin, et al., Traffic Control Management and Road Safety Using Vehicle to Vehicle Data Transmission Based on Li-Fi Technology, International Journal of Computer Science, Engineering and Information Technology (IJCSEIT), vol. 6, No. 3/4, Aug. 2016.
Trong-Hop Do, et al., Performance Analysis of Visible Light Communication Using CMOS Sensors, Sensors 2016, 16, 309.
Michael Vasilakis, DynaLight: A Dynamic Visible Light Communication Link for Smartphones, Master's Thesis, Delft University of Technology, 2015.
Chaurasiya et al., High Dynamic Range Imaging for Dynamic Scenes, Communication Systems and Network Technologies (CSNT), Fourth International Conference, IEEE, 2014.
Debevec et al., Recovering High Dynamic Range Radiance Maps for Photographs, ACM SIGGRAPH 2008 classes. ACM, 2008.
Mertens et al, Exposure Fusion, Computer Graphics and Applications, 15th Pacific Conference, IEEE, pp. 382-390, 2007.
Robertson et al., Dynamic Range Improvement Through Multiple Exposures, ICIP 99 Proceedings, 1999 International Conference, IEEE, vol. 3, pp. 159-163.

* cited by examiner

DETECTION OF VISIBLE LIGHT COMMUNICATION SOURCES OVER A HIGH DYNAMIC RANGE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to visible light communication (VLC) sending digital data, and, more specifically, to detection and isolation of multiple VLC sources in video camera images and optimizing signal-to-noise performance and data transmission speed by capturing sub-windowed images for each VLC source.

Visible light based communication (VLC), also referred to as LiFi, is a wireless data communication technology being actively researched for automotive applications and for consumer electronics applications. Data transmission involves modulating (i.e., flashing) a light source such as a light emitting diode (LED) to encode data, and receiving the modulated light at a light sensor such as a photodiode or a camera to decode the data.

A vehicle having a VLC receiver might receive VLC signals from a fixed source (e.g., an LED traffic light) or from a mobile source (e.g., an LED signal light such as a taillight on another car). The data being shared may be related to traffic information or control, hazard warnings, navigation assistance, and many other types of data. A preferred image sensor is a "camera on a chip" comprising a two-dimensional array of pixels for capturing successive image frames taken at a rate that can distinguish the flashing of the light source. A camera with a wide field of view is desirable in order to detect and track a VLC image source, or even multiple sources simultaneously. In addition, multiple cameras can provide a mosaic of adjacent or overlapping images with limited fields of view that can be stitched together. A typical VLC transmitter uses a singular LED or an array of LEDs.

Complementary metal-oxide semiconductor (CMOS) image sensors are particularly advantageous since they provide good image quality with low power requirements, are low cost, and are often already present on a vehicle as an object detection sensor for other vehicle systems (e.g., an advanced driver assistance system such as a lane departure monitor, blind spot detector, adaptive cruise control, or automatic parking guidance). CMOS image sensors are also common on other types of devices which may be used as VLC receivers, such as smartphones.

A CMOS imager utilizes an image read-out process known as a rolling shutter, wherein the image exposure and read-out functions are conducted on a row-by-row basis (i.e., the rows of pixel are converted into a digital signal one row at a time). The use of a rolling shutter results in a temporal aliasing, wherein the image's pixel row/columns include a slight time delay that may capture artifacts in moving objects or changes in lighting levels in the scene since different rows within a single image frame will capture the same object at slightly different times. This property of the rolling shutter has been used to increase the data rate of a VLC transmission by flashing the LED source at a frequency corresponding to the exposure times of successive rows (requiring that the LED source spans a plurality of the pixel rows in the camera). The resulting image of the LED source consequently displays alternating bands of light and dark lines which encode successive bits in a serial data stream. An example is shown in U.S. application Ser. No. 15/975,033, filed May 9, 2018, entitled "Visible Light Communication System With Pixel Alignment For High Data Rate," which is incorporated herein by reference in its entirety.

The outdoor environments for automotive applications of light-based communication pose several significant challenges. A primary challenge is detecting and reading data transmission from relatively dim LiFi sources in that also include bright ambient light sources such as the sun. Another challenge is there may be multiple LiFi devices transmitting simultaneously with varying light intensity. This results in a difficult environment for detecting dim signals or signals where the ON/OFF states are hard to distinguish. Alternatively, the exposure settings of the camera may result in blooming artifacts when imaging the LiFi transmitter during night time operations. Photodiodes would offer a large dynamic range in the analog-to-digital response, but they would not be able to distinguish data transmission from LED's of similar intensity since photodiodes do not detect the location of a light source, just the intensity. Moreover, a photodiode lacks the ability of a camera to localize a LiFi transmitter. While a camera sensor such as a CMOS-based device would allow discernment between two LED signals of similar intensity, it typically does not have sufficient dynamic range to operate in challenging day time environments with a great amount of ambient light. Additionally, there are other challenges relating to the varying intensity LiFi signals in an automotive environment interfering with one another and making it difficult to increase data transfer rates.

SUMMARY OF THE INVENTION

In order to reliably distinguish one or more VLC sources among a collection of objects over a wide range of intensities within the same visual scene, the present invention first obtains a high dynamic range (HDR) image. In a preferred embodiment, the HDR image may be based on a series of image frames captured at varying exposure durations which are fused into a single composited dynamic range image. A sequence of one or more HDR images and/or the captured image frames are searched for evidence of LiFi light sources based on their having a temporal variation (image to image capture) and/or a spatial variation (e.g., due to the artifacts of a CMOS camera rolling shutter). In addition to detecting the locations of VLC sources (i.e., their subwindow "footprint" in the image frame), the HDR image is also used to determine an optimal exposure duration for each respective VLC source. For example, an average or median value (e.g., brightness) of the pixels within the subwindow (i.e., bounding box) containing an individual source (e.g., an LED array) is used to calculate a respective optimal exposure. Alternatively, the optimal exposure can be identified as the minimal exposure time that provides a sufficiently robust differentiation between the ON and OFF states. The optimal exposures preferably are implemented as an exposure time duration, but could also involve adjustment of a camera sensitivity (i.e., ISO setting) or a camera aperture. Using the respective optimized exposures, the identified VLC sources are each viewed separately in their individual field of view (FOV) subwindows. By separately capturing series of images from the subwindows only, a higher frame rate is achieved since only a fraction of the camera's full set of pixels are read out. The use of a higher image capture rate and an optimal exposure time provides the ability to maximize data transfer rates. Subwindowing avoids disadvantages of using a global exposure time which may prevent data transmission from low intensity LED sources altogether or may lower the data transmission rates obtained with higher brightness LED sources.

In one preferred aspect of the invention, a visible light communication (VLC) method comprises capturing frames of a scene with a camera. The method assembles an enhanced dynamic range image sequence from the frames. At least one VLC source is detected in the enhanced sequence occupying a respective subwindow. An exposure at the subwindow is optimized according to a brightness of the respective VLC source. Then a plurality of subwindow images are captured using the optimized exposure. VLC data visible in the subwindow images is then decoded. As used herein, brightness refers to any particular modulation in intensity (with or without changes in color) using any known encoding scheme for VLC.

DETAILED DESCRIPTION OF PREFERRED EMBODIMENTS

Figure 1:
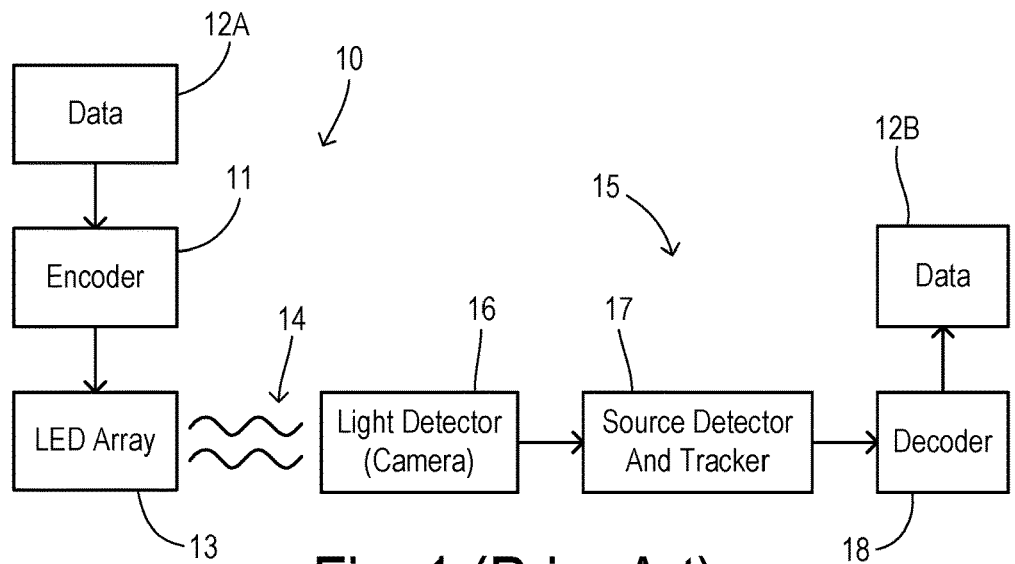
FIG. 1 is a block diagram showing a conventional VLC system.

FIG. 1 shows a conventional visible light communication system having a VLC transmitter 10 and a VLC receiver 15. Transmitter 10 includes an encoder 11 which receives data 12A to be transmitted, and which drives an LED array 13 to emit a flashing VLC light signal according to the encoded data and a chosen communication protocol. LED array 13 may be part of a dual purpose light source which adds the VLC function to a traffic light, vehicle running light, a LCD/OLED display of a mobile device (e.g. a cell phone), fixed display or signage, or other types of artificial lighting applications. Visible light 14 projected from LED array 13 flashes at a high rate which is undiscernible to the human eye but which carries data to a light detector 16 (e.g., a camera) in receiver 15. A source detector and tracker 17 receives a succession of image frames from camera 16, and uses known techniques for identifying any transmitting VLC sources and extracting the flashing signals inherent in the collected frames. The flashing information is then processed by a decoder 18 which recovers data 12B as a copy of the original data 12A sent by transmitter 10.

Figure 2:
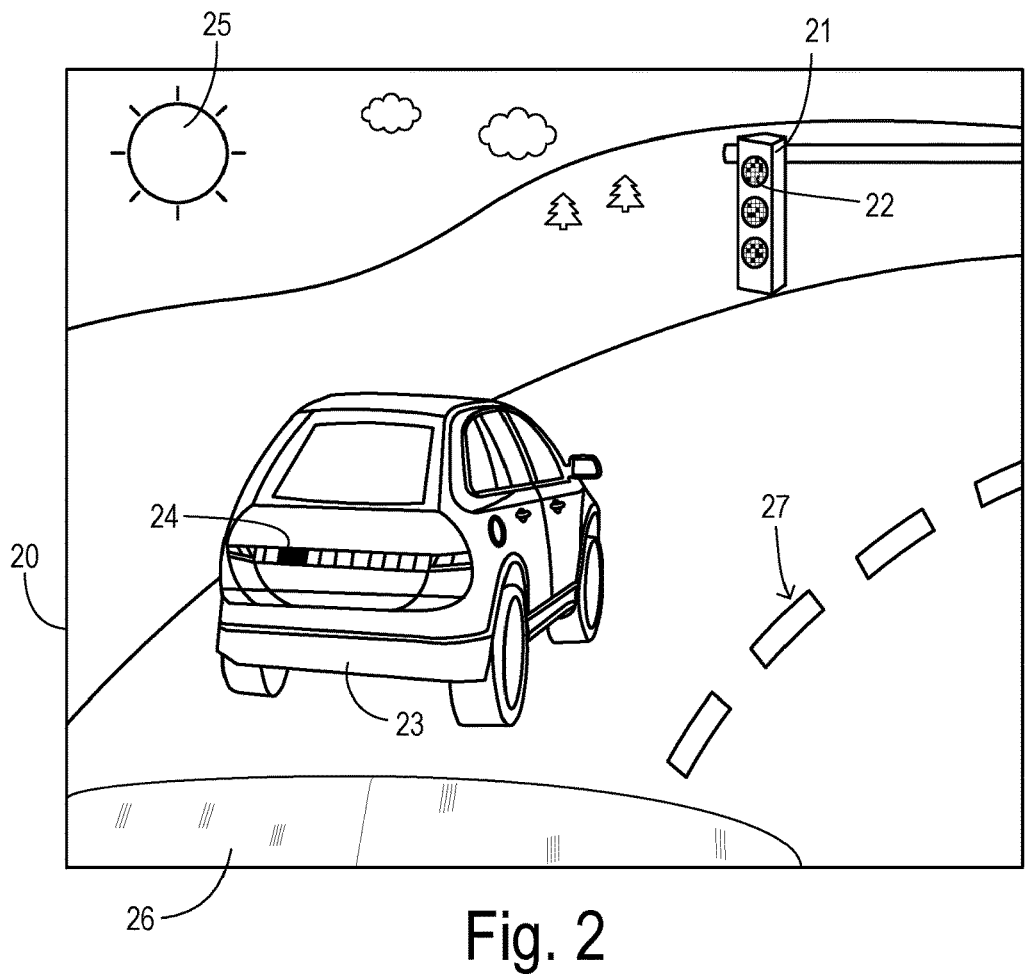
FIG. 2 shows an example of a video frame captured by an image sensor with multiple light sources visible in the frame.

FIG. 2 shows a sample image 20 taken by a receiving camera in a motor vehicle which may include more than one potential source of VLC signals. A traffic light 21 includes an LED array 22 as part of the production of traffic signals, and a vehicle 23 includes an LED array 24 as part of a brake or taillight of vehicle 23. A typical image may include other natural or artificial light sources that need to be examined as to whether they carry VLC signals, such as the sun 25. The source detector and tracker uses conventional techniques (e.g., monitoring high frequency variations in intensity) in order to identify objects in the images having the characteristic flashing of standard VLC signals, and then the corresponding objects are inspected to extract the standard VLC signals.

Image frame 20 also shows a hood 26 of the motor vehicle and elements of the surrounding environment such as roadway lane markers 27. The camera or other image sensor used in the invention may preferably be a multi-purpose device which captures images for reception of VLC data as well as images used to support other advanced driver assistance systems (ADAS) such as lane departure warning. Image capture for receiving VLC data can be interspersed with frame captures for the ADAS functions, and many image capture events could be used for both systems.

Figure 3:
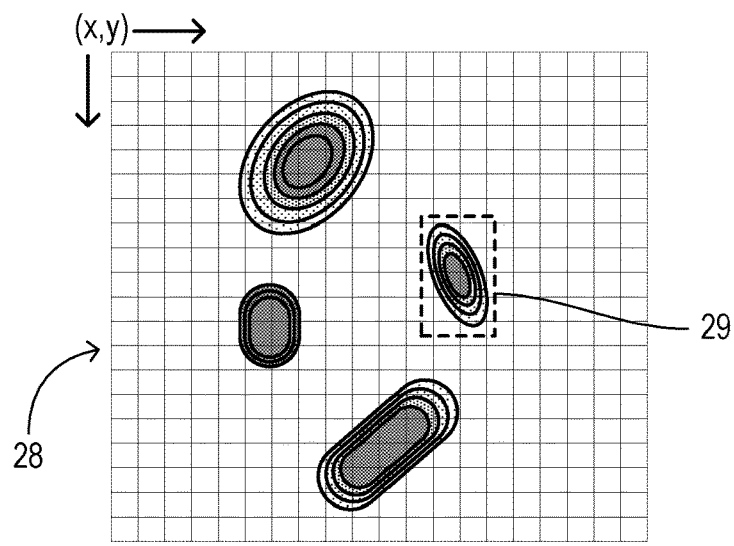
FIG. 3 is another example of tracked objects (e.g., light sources) within an image frame.

FIG. 3 depicts an image frame 28 comprising a grid of columns and rows of pixels (x, y) wherein each individual pixel in a captured image includes respective pixel intensity values. For tracking movement between successive frames of an object/VLC source and for reading out subwindow images, a bounding box or subwindow 29 is identified around a respective object using known techniques.

Figure 4:
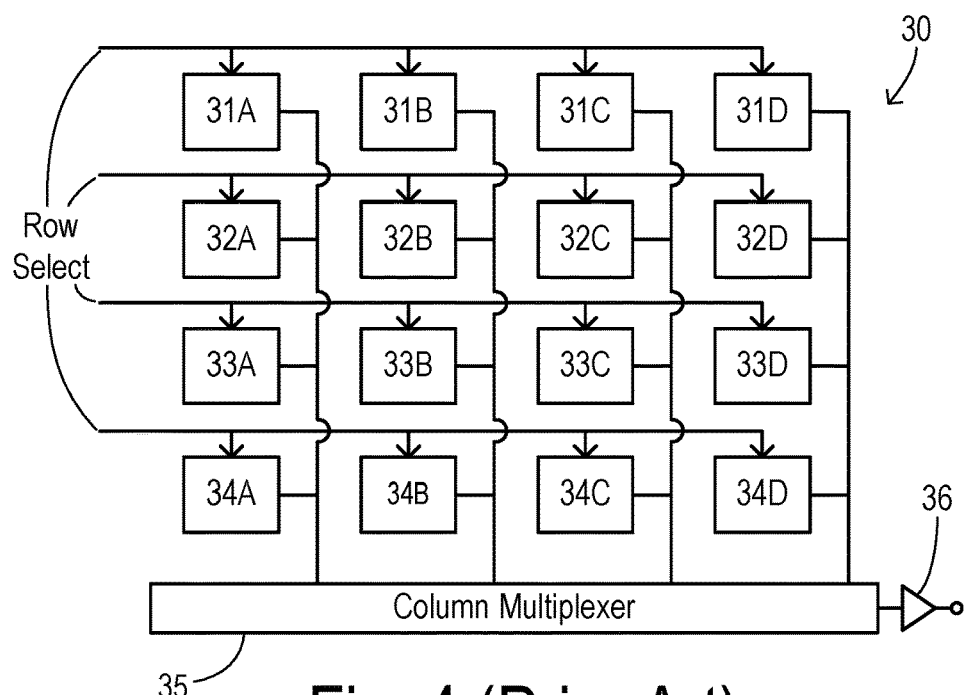
FIG. 4 is a block diagram of a portion of a CMOS image sensor.
Figure 5A:
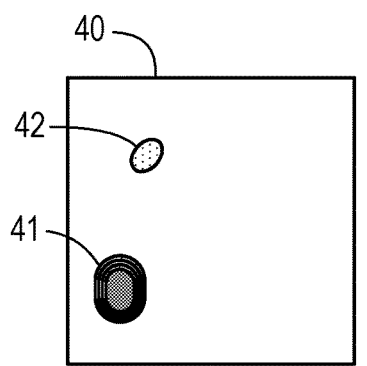
FIGS. 5A-5H show a bracket sequence of images of a scene with successive images captured with a progressively longer exposure duration while the light sources maintain their same intensities.
Figure 5B:
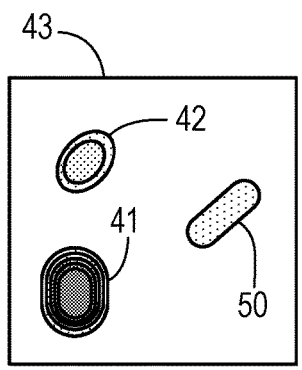
Figure 5C:
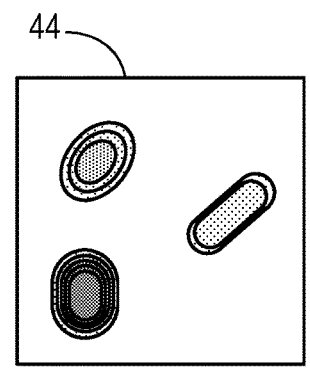
Figure 5D:
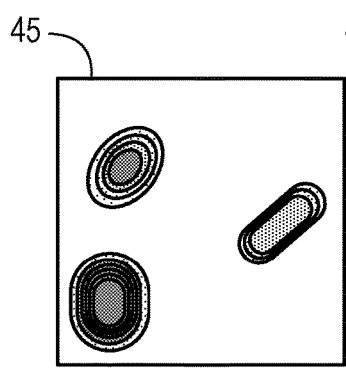
Figure 5E:
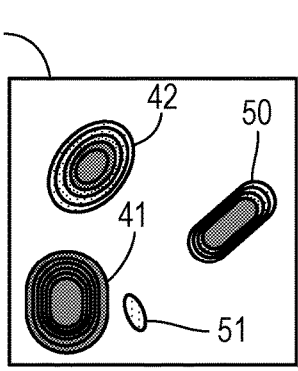
Figure 5F:
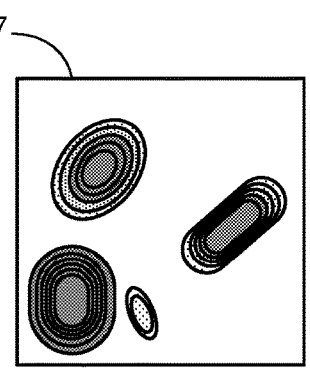
Figure 5G:
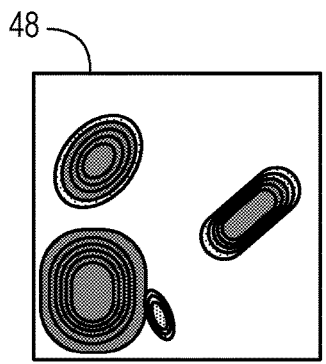
Figure 5H:
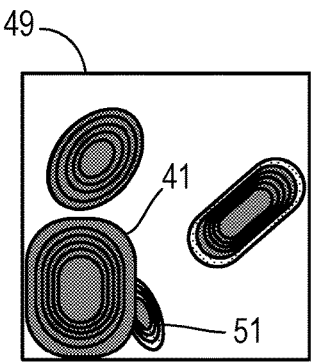

FIG. 4 shows a small portion of a typical CMOS camera 30. A top row of pixels 31 has individual pixels 31A, 31B, 31C, and 31D. Rows 32, 33, and 34 are arranged beneath row 31, so that all the individual pixels fall into columns A, B, C, and D. A set of Row Select lines each respectively connects to the pixels of a respective row. Output lines from each respective pixel of the same column are directly connected to a column multiplexer 35 in common. An output from column multiplexer 35 is amplified through a buffer amplifier 36 to provide readout of pixel values for image frames from camera 30 as known in the art. A particular Row Select line is activated during the time that a particular row is read out, so that only the outputs of that row are sent to column multiplexer 35 at any one time. During a subwindow image capture, only the pixels within a desired subwindow are accessed, whereby the total subframe readout time is substantially less than the readout time for a full frame.

A preferred method for obtaining a high dynamic range (HDR) image involves the use of bracketing wherein separate image frames are obtained using a range of exposures (i.e., integration times) and the resulting frames are combined into a single image frame in which an optimal intensity is presented for both light and dark areas in the original scene in a standard intensity or high dynamic range image. For example, many digital cameras are available having an Automatic Exposure Bracketing (AEB) function wherein one press of a shutter release button causes the camera to capture a darker image, lighter image, and normal image, and many software packages or add-ons are available for combining bracketed image frames into an HDR image (automatically or manually). Conventional methods are described in 1) Debevec et al., *Recovering High Dynamic Range Radiance Maps From Photographs*, ACM SIG-GRAPH 2008 classes. ACM, 2008; 2) Robertson et al., *Dynamic Range Improvement Through Multiple Exposures*, ICIP 99 Proceedings, 1999 International Conference, IEEE, Volume 3, pages 159-163; and 3) Mertens et al., *Exposure Fusion*, Computer Graphics and Applications, 15th Pacific Conference, IEEE, pages 382-390. 2007.

Figure 6:
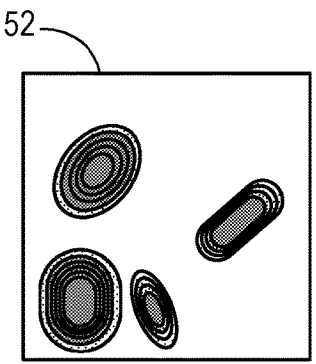
FIG. 6 shows an HDR image created using the bracketed sequence of FIGS. 5A-5H.

FIGS. 5A to 5H show how a gradually stepped-up exposure setting creates a series of image frames ranging from dark (i.e., underexposed) to light (i.e., overexposed). For objects with different brightness (i.e., intensity), an optimal exposure may be achieved in different ones of the frames in the series. In FIGS. 5A to 5H, the brightest objects 41 and 42 are apparent in a first frame 40 in FIG. 5A having a lowest exposure (e.g., shortest time). Frames 43-49 in FIGS. 5B-5H have progressively higher exposure (longer exposure times) such that additional objects 50 and 51 also become apparent. As objects become overexposed, blooming may occur and nearby objects may merge, as shown by objects 41 and 51 in FIG. 5H. The HDR process combines a series of frames (e.g., frames 40 and 43-49, or a lesser or greater number of frames) into an HDR image 52 shown in FIG. 6 with each region of image 52 exhibiting an exposure value resulting in best visibility for each object present.

Figure 7:
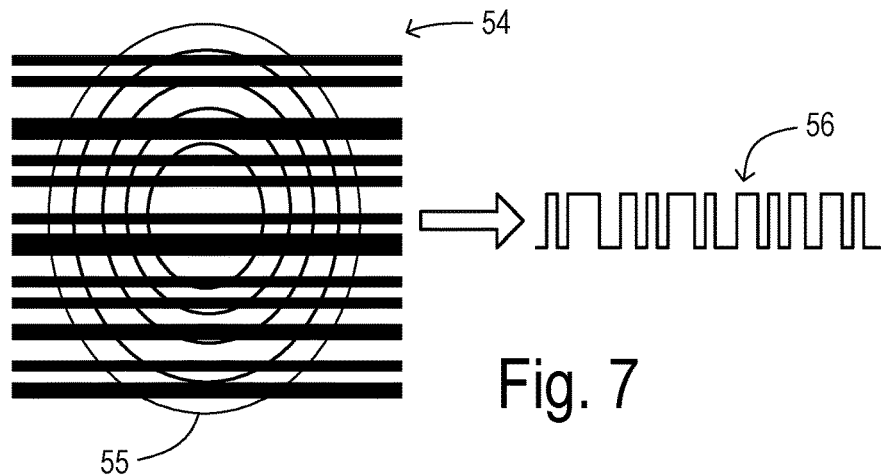
FIG. 7 shows a subwindow image of a VLC source captured using a CMOS image sensor with a rolling shutter and an optimal exposure.
Figure 8:
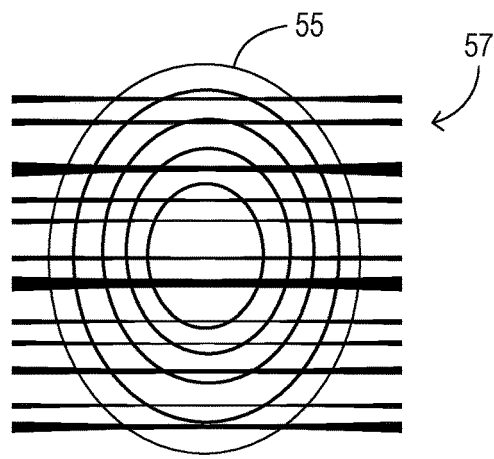
FIG. 8 shows a subwindow image of the VLC source of FIG. 7 in which overexposure leads to loss of VLC data.

In the case of a rolling-shutter CMOS image sensor wherein flashing of the VLC source occurs at a rate faster than the time taken to expose all the rows/columns receiving the image of the VLC source, an optimal exposure obtains an image 54 distinctly revealing the flashing as bright and dark bands over the image of a VLC source 55. In FIG. 7, bright areas are shown in white and dark areas are shown in black (which is reversed from FIGS. 5 and 6 wherein brighter areas are shown with a denser stippling so that they appear darker in those figures). As a result of having sharp boundaries between light and dark bands, an encoded digital signal 56 can be accurately recovered from image 54. An underexposed image would fail to record the intended information. An overexposed image would obscure the information. As shown in FIG. 8, an overexposed image 57 results in blooming of VLC source 55 during exposure of the ON state so that the dark bands are overwhelmed along their edges. Since dark bands are narrowed or lost, the data encoded in the bands is unrecoverable. Therefore, to maintain a high rate of data transfer, it is important to maintain a proper image exposure for each VLC source.

Figure 9:
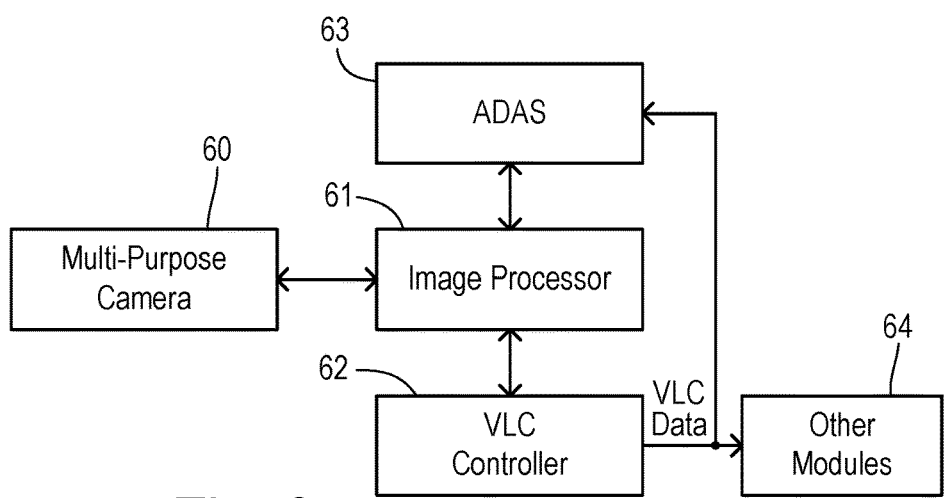
FIG. 9 is a block diagram showing one preferred embodiment of the invention used in a motor vehicle.

FIG. 9 shows a first embodiment of apparatus for performing the present invention, including a multi-purpose camera 60 mounted to a motor vehicle. Camera 60 has a two dimensional array of pixels and is preferably a CMOS image sensor. Image data is read out to an image processor 61 which controls the readout operations, compiles image data, and transmits image data to a VLC controller 62 and to an ADAS controller 63. The same or separate imaging data can be provided from camera 60 to the interconnected VLC and ADAS controllers. In particular, controllers 62 and 63 may issue image requests to image processor 61 according to their needs. Once a VLC data stream is recovered by VLC controller 62, it is transmitted to ADAS controller 63 or to other modules 64 within the vehicle that will make use of the data for ADAS and other functions.

Figure 10:
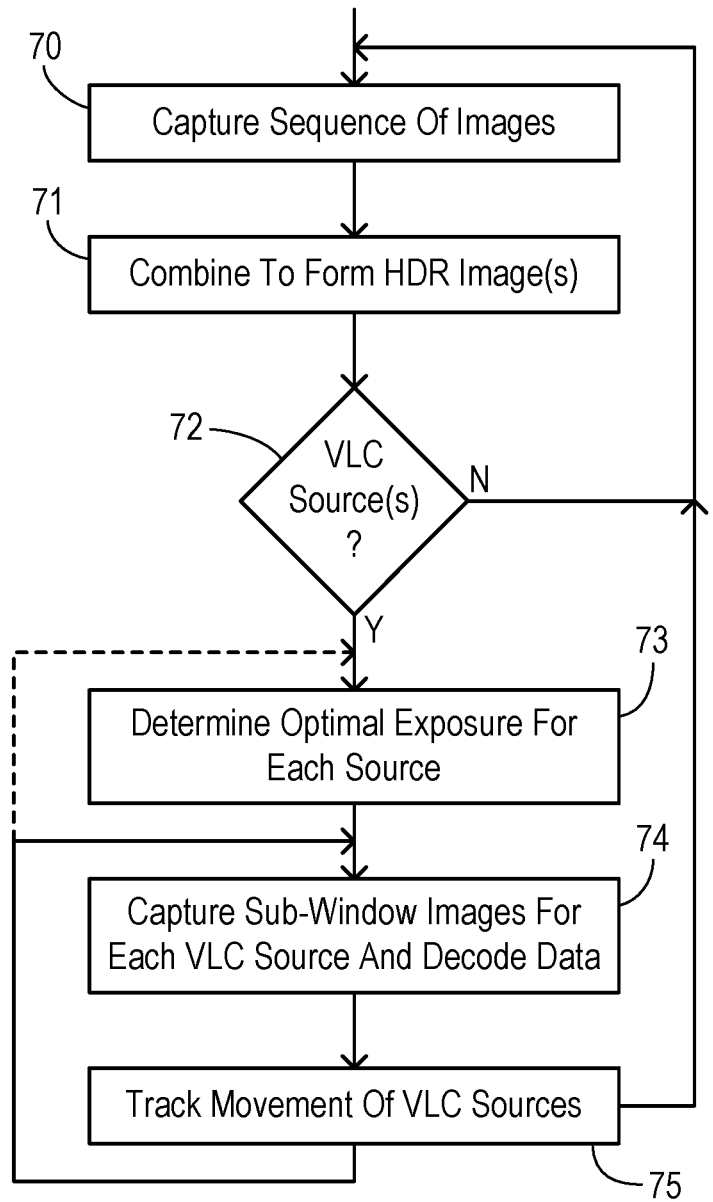
FIG. 10 is a flowchart showing a preferred method of the invention.

A main embodiment of a method of the invention is shown in FIG. 10. A plurality of images are captured as one or more sequences from the CMOS image sensor or other video camera in step 70. The sequence of images are combined to form a plurality of HDR images in step 71. Thus, each HDR image may be obtained from multiple image frames or from a single image frame depending on the particular HDR process that may be chosen, and then multiple HDR images are analyzed in order to detect the flashings of a VLC source in step 72. In one embodiment, the captured sequence of images in step 70 may include bracketed images for using multiple different exposures to create each HDR image, and in another technique as described later an HDR image can be directly obtained from a single image frame according to a variable exposure on a pixel by pixel basis within the image frame. When no VLC sources are detected in step 72, then the method continues to monitor for VLC sources by repeatedly executing step 70-72.

When a VLC source is detected in step 72, then an optimal exposure is determined for each source in step 73. The optimal exposure is determined according to the brightness of each source. This may also be impacted by the encoding scheme and data transmission rate of the transmitting source. When using exposure fusion to create the HDR image, then the process for forming the HDR images may inherently identify the optimal exposure. Alternatively, once a subwindow is defined which contains a VLC source then the pixels within the subwindow can be analyzed to calculate an optimal exposure. For example, the median or other average value of the pixels within the can be calculated to identify the optimal exposure (thereby achieving a clear differentiation in the light intensity fluctuations compared to background noise while avoiding overexposure and blooming). As stated above, the optimal exposure can be determined according to an exposure time, and aperture, an ISO sensitivity, or color filtering used for image capture.

In step 74, subwindow images are captured for each VLC source and after a series of such images have been captured then the transmitted data may be decoded. During the image capture and decoding process, the movement of each VLC source is tracked in step 75 so that the respective subwindows remain centered over the appropriate regions within the full image frame. During tracking, it may be desirable to occasionally determine the optimal exposure for a respective VLC source by returning to step 73 instead of step 74.

Figure 11:
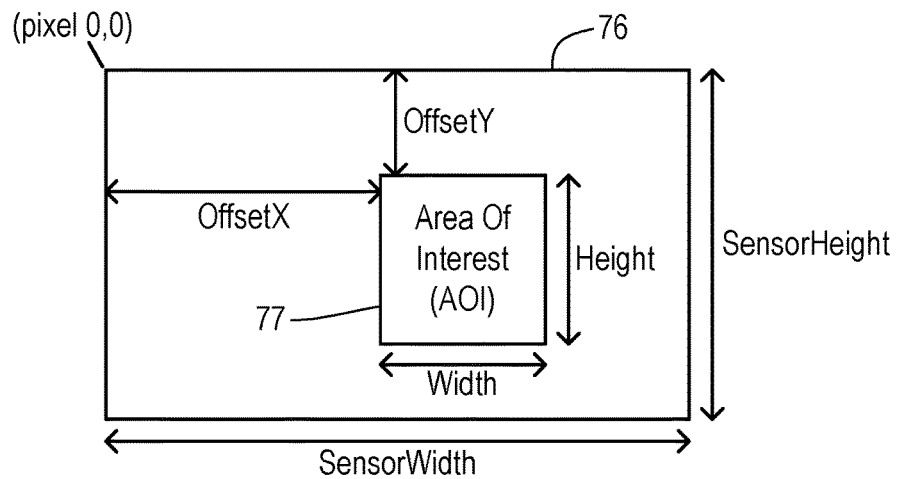
FIG. 11 depicts an image frame with an area of interest for defining a subwindow.

FIG. 11 defines a subwindow used to monitor a VLC source. A full camera frame 76 has a multitude of pixels starting at a pixel origin (0,0). The image sensor has a sensor width and a sensor height with the pixels arranged in a two-dimensional, rectangular grid. A subwindow 77 corresponds to an area of interest containing a detected VLC source. A location of subwindow 77 is specified by OffsetX, and OffsetY, a subwindow width, and a subwindow height. During subwindow image capture, sensor readout occurs only in subwindow 77 in order to capture an image of the area of interest in a much shorter amount of time than required for capturing a full camera frame and using an exposure setting matched to brightness of the VLC source.

Figure 12:
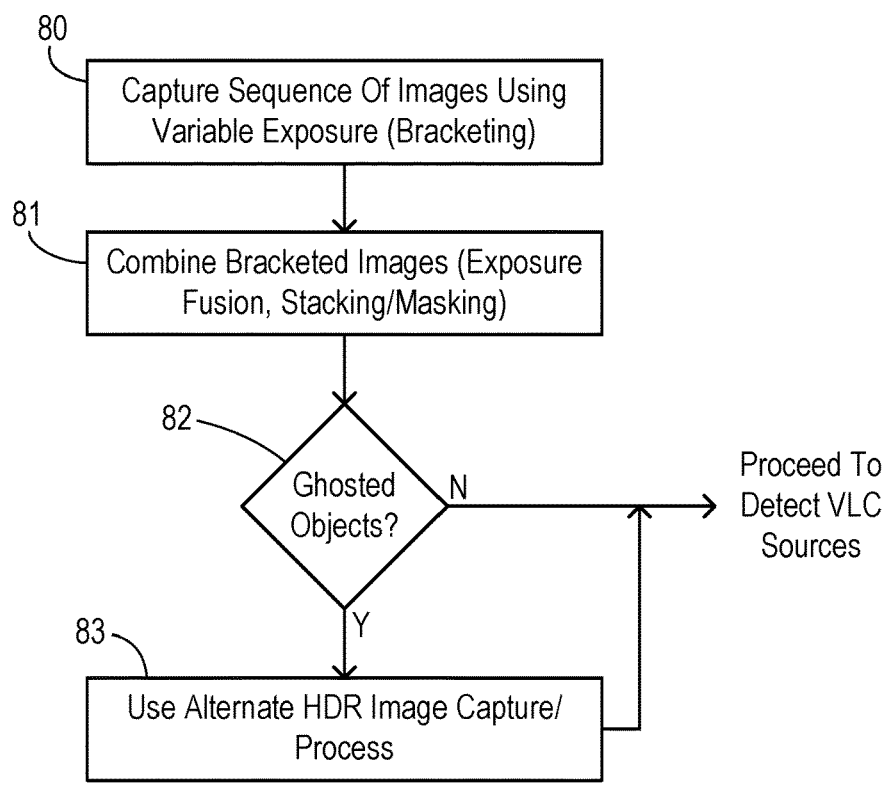
FIG. 12 is a flowchart showing another method of the invention.

Another method for obtaining containing the HDR images is shown in greater detail in FIG. 12. Since processing time is a limited resource, it is desirable to use a computationally efficient method to create the HDR images. When a scene is fairly static (i.e., object positions move little between frames), then deriving an HDR image is more straightforward. Various examples of suitable methods are shown in Aguerrebere, et al, "Best algorithms for HDR image generation. a study of performance bounds," *SIAM Journal on Imaging Sciences* 7 (2014) pp. 1-34. Variable exposure bracketing is a preferred method which is relatively efficient but which may be less robust when there are objects moving quickly across the image frame. Under such circumstances, a different HDR process may be needed. The method shown in FIG. 12 captures a sequence of images using variable exposure bracketing in step 80. In step 81, the bracketed images are combined to form an HDR image using an efficient process which assumes there are no VLC sources moving (i.e., shifting laterally) at a fast rate. The process may include exposure fusion as known in the art, or another known process such as stacking of masked images. A check is performed in step 82 to determine whether there are any ghosted objects within the resulting HDR image. Ghosting refers to an object which has significantly shifted position between the individual image frames used in the HDR combination process, such that the moving object appears as multiple copies each seen as a lightened image, spread over distinct positions in the combined image. A known image recognition process can be used to detect the repeated image blocks associated with a ghosted object. If no ghosted objects are detected, the method proceeds to detect VLC sources in the method of FIG. 10.

If a ghosted object is detected, then an alternative HDR image capture/combination process is used in step 83. There are several known techniques to create a high dynamic range image with dynamic scenes where moving objects would generate "ghosting" artifacts in a fused image. Although the occurrence of ghosting would be relatively low given that the image capture time period in automotive VLC applications would be relatively quick compared to the changing visual scene, it may still be beneficial to extend the capabilities of VLC communication to such instances. One particular HDR method is disclosed in Chaurasiya, et al, "High Dynamic Range Imaging for Dynamic Scenes." *Communication Systems and Network Technologies (CSNT), Fourth International Conference*, IEEE, 2014, wherein a single image is captured at once while the exposure is varied on a per pixel basis. This spatial varying exposure (SVE) method employs multiple exposure fields (i.e., pattern within a pixel array) and color filtering according to another pattern to create an HDR image without ghosting of fast moving objects.

Regarding the determination of the optimum exposure to apply within a subwindow for a VLC source (e.g., an LED array), it may be desirable to take into account the ON/OFF flashing of the source. For example, a captured image sequence for a VLC source includes a VLC signal in which the corresponding pixels alternate between being ON or OFF. Two different camera response curves over the image sequence of varying exposures can be constructed from the raw pixel data, one each for the ON and OFF states of the source. Using a distribution of the number of pixels for the ON and OFF states over a plurality of the exposures, two separate distributions (i.e., populations) can be identified. A minimum optimal exposure time can be selected that produces a dark image for pixels in the OFF state. A predicted minimal exposure time can be verified after an initial amount of data decoded based upon the results of error checking and overall operational performance using the predicted value and transmitter frequency. This approach assumes that the imaged pixel region (subwindow) is uniformly on or off. If this is not the case, the subwindow may be further subdivided into additional regions to obtain the desired camera response function curve.

The foregoing invention provides a detection method utilizing high dynamic range imaging (which may include methods to deal with a dynamic moving scene) to detect multiple light based communication devices of varying intensity in outdoor daytime environments in the presence of sunlight or other noise sources, and where multiple light based communication devices may be transmitting and interfering with one another. The invention gives a CMOS-based camera sensor the ability to utilize an optimal exposure setting for each VLC source to maximize data transmission. Furthermore, the invention provides the ability to track the VLC device within the field of view via "subwindowing" which captures only the camera pixels corresponding to an individual light signal transmitter, which rapidly increases the refresh rate of image capture of the device compared to full image capture so that higher data transmission rates can be received. In addition, the invention can alternate between global image capture for ADAS and capturing sequences of subwindowed images for VLC.

What is claimed is:

1. A visible light communication (VLC) method, comprising:
   capturing frames of a scene with a camera;
   assembling an enhanced dynamic range image sequence from the frames;
   detecting at least one VLC source in the enhanced sequence occupying a respective subwindow;
   optimizing an exposure at the subwindow according to a brightness of the respective VLC source;
   capturing a plurality of subwindow images using the optimized exposure; and
   decoding VLC data visible in the subwindow images.

2. The method of claim 1 wherein the frames assembled into each image in the enhanced dynamic range image sequence are comprised of a plurality of bracketed frames having a variable exposure.

3. The method of claim 2 wherein the variable exposure is comprised of respective exposure times for respective frames.

4. The method of claim 2 wherein the assembling step is comprised of an exposure fusion process for combining the assembled frames.

5. The method of claim 2 wherein the assembling step is comprised of an image stacking process for combining the assembled frames.

6. The method of claim 2 wherein the assembling step comprises:
   evaluating an image in the enhanced dynamic range image sequence based on bracketed frames having a variable exposure for a predetermined ghosting; and
   if the predetermined ghosting is detected then applying a ghosting correction in assembling the enhanced image sequence.

7. The method of claim 6 wherein the ghosting correction is comprised of an alternate dynamic range enhancement wherein a color filtering and an exposure are varied within each individual captured frame.

8. The method of claim 1 wherein the optimized exposure is comprised of an exposure time applied during capturing of each respective subwindow image.

9. The method of claim 1 wherein the optimized exposure is comprised of an image sensor sensitivity applied during each respective subwindow images.

10. The method of claim 1 wherein a plurality of VLC sources are detected at a plurality of respective subwindows, and wherein subwindow images captured at each respective subwindow has a respective optimized exposure.

11. The method of claim 1 wherein the camera is comprised of a CMOS image sensor capturing frames using a rolling shutter.

12. The method of claim 1 wherein the camera is comprised of a multi-purpose camera in a passenger vehicle, and wherein the camera is interconnected to provide captured frames to an advanced driver assistance system.

13. A visible light communication (VLC) receiver comprising:
a camera having a two-dimensional array of pixels capturing image frames containing VLC sources; and
a controller adapted to A) assemble an enhanced dynamic range image sequence from the frames, B) detect at least one VLC source in the enhanced sequence occupying a respective subwindow, C) optimize an exposure at the subwindow according to a brightness of the respective VLC source, D) capture a plurality of subwindow images using the optimized exposure, and E) decode VLC data visible in the subwindow images.

14. The receiver of claim 13 wherein the camera is comprised of a CMOS image sensor capturing frames using a rolling shutter.

15. The receiver of claim 13 wherein the camera is comprised of a multi-purpose camera in a passenger vehicle, and wherein the camera is interconnected to provide captured frames to an advanced driver assistance system in the vehicle.

16. The receiver of claim 13 wherein the controller is adapted to assemble the frames into each image in the enhanced dynamic range image sequence using a plurality of bracketed frames having a variable exposure.

17. The receiver of claim 16 wherein the frames are assembled using exposure fusion.

18. The receiver of claim 16 wherein the controller evaluates an image in the enhanced dynamic range image sequence based on bracketed frames having a variable exposure for a predetermined ghosting, and if the predetermined ghosting is detected then the controller applies a ghosting correction in assembling the enhanced image sequence.

19. The receiver of claim 18 wherein the ghosting correction is comprised of an alternate dynamic range enhancement wherein a color filtering and an exposure are varied within each individual captured frame.

20. The receiver of claim 13 wherein a plurality of VLC sources are detected at a plurality of respective subwindows, wherein subwindow images captured at each respective subwindow has a respective optimized exposure, and wherein each respective optimized exposure is comprised of an exposure time.

* * * * *